United States Patent
Morioka et al.

(10) Patent No.: US 7,122,277 B2
(45) Date of Patent: *Oct. 17, 2006

(54) BATTERY AND BATTERY ELECTRODE

(75) Inventors: Yukiko Morioka, Minato-ku (JP);
Masaharu Satoh, Mianato-ku (JP);
Shigeyuki Iwasa, Minato-ku (JP);
Yutaka Ban-Nai, Minato-ku (JP);
Kentaro Nakahara, Minato-ku (JP)

(73) Assignee: NEC Corporation, Tokyo (JP)

( * ) Notice: Subject to any disclaimer, the term of this patent is extended or adjusted under 35 U.S.C. 154(b) by 360 days.

This patent is subject to a terminal disclaimer.

(21) Appl. No.: 10/170,349

(22) Filed: Jun. 14, 2002

(65) Prior Publication Data

US 2003/0044681 A1 Mar. 6, 2003

(30) Foreign Application Priority Data

Jul. 9, 2001 (JP) ............................ 2001-208188

(51) Int. Cl.
*H01M 4/60* (2006.01)
(52) U.S. Cl. .................................................... 429/213
(58) Field of Classification Search ................ 429/213
See application file for complete search history.

(56) References Cited

U.S. PATENT DOCUMENTS 4,397,922 A * 8/1983 Pokhodenko et al. ....... 429/105

(Continued)

FOREIGN PATENT DOCUMENTS

JP 5-74459 A 3/1993

(Continued)

OTHER PUBLICATIONS

H. Goto et al., "Syntheses and ESR characterizations of conjugated polymers with nitrogen atoms", Synthetic Metals 85, (1997), pp. 1683-1684 with Abstract.

*Primary Examiner*—Tracy Dove
(74) *Attorney, Agent, or Firm*—Sughrue Mion, PLLC (57) ABSTRACT

The present invention relates to a battery comprising at least a positive electrode, a negative electrode and an electrolyte as composing elements, wherein the positive electrode and/or the negative electrode comprise an active material of nitroxyl radical compound represented by the following general formula (1) as a starting material or a reaction product of at least a discharge reaction of electrode reactions:

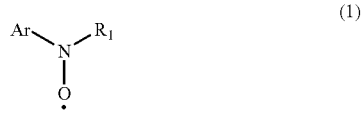

(1)

wherein Ar represents substituted or unsubstituted aromatic heterocyclic group containing nitrogen wherein one endocyclic nitrogen atom or at least one of plural endocyclic nitrogen atoms exists as N-oxide; the substituent $R_1$ represents hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, or substituted or unsubstituted acyl group, wherein one or more of the atoms may be substituted with sulfur atom, silicon atom, phosphorus atom or boron atom; $R_1$ may be the identical with Ar and a ring structure may be formed between $R_1$ and Ar.

4 Claims, 1 Drawing Sheet

U.S. PATENT DOCUMENTS

| | | | |
|---|---|---|---|
| 4,442,187 A | 4/1984 | MacDiarmid et al. | |
| 4,547,439 A * | 10/1985 | Genies | 429/105 |
| 4,833,048 A | 5/1989 | Dejonghe et al. | |
| 6,866,964 B1 * | 3/2005 | Nakahara et al. | 429/213 |
| 2003/0096165 A1 * | 5/2003 | Nakahara et al. | 429/213 |
| 2004/0115529 A1 * | 6/2004 | Nakahara et al. | 429/213 |
| 2004/0197653 A1 * | 10/2004 | Inatome et al. | 429/213 |

FOREIGN PATENT DOCUMENTS

| | | |
|---|---|---|
| JP | 8-195199 A | 7/1996 |
| JP | 8-329947 A | 12/1996 |
| JP | 2715778 B2 | 11/1997 |
| JP | 10-50297 A | 2/1998 |
| JP | 10-154531 A | 6/1998 |
| JP | 11-288740 A | 10/1999 |
| JP | 2000268861 A * | 9/2000 |
| JP | 2002117855 A * | 4/2002 |

* cited by examiner

FIG. 1

BATTERY AND BATTERY ELECTRODE

BACKGROUND OF THE INVENTION

1. Field of the Invention

The present invention relates to a battery comprising at least a positive electrode, a negative electrode and an electrolyte as composing elements, and to battery electrodes therefore, and more particularly, to the battery having nitroxyl radical compounds as a active material of the positive and/or the negative electrode, high energy density and excellent stability, and to electrodes suitable to form the battery such as this.

2. Description of the Related Art

A battery is a device which can take out chemical energy as electric energy utilizing oxidation-reduction reactions occurring on a positive electrode and a negative electrode or can store electric energy as chemical energy, and is utilized as a power source in various equipment.

Recently, with the spread of mobile electronic equipment, there have been increased needs for a lightweight battery with a large capacity. To satisfy the needs, a battery has been developed which utilizes alkali-metal ions whose mass per unit electric charge is light. Among others, a lithium-ion battery is particularly utilized for various mobile equipments for its superiority in stability and large capacity. The lithium-ion battery uses a heavy-metal oxide containing lithium as an active material in the positive electrode and a carbon electrode as an active material in the negative electrode respectively and charge and discharge are performed utilizing a reaction of lithium-ion insertion in and elimination from these electrodes.

However, since the lithium-ion battery utilizes a heavy-metal compound with large specific gravity particularly as an active material in the positive electrode, it has not a sufficient capacity per unit mass of the battery and there has been a problem that it cannot act as a battery having a high energy density.

Therefore, developments of a battery having a large capacity utilizing electrode materials having less weight have been tried. For example, U.S. Pat. No. 4,833,048 and Japanese Patent 2,715,778 have disclosed a battery using an organic compound having a disulfide bond as an active material in a positive electrode, which utilizes an electrochemical oxidation-reduction reaction based on formation and dissociation of the disulfide bond.

Since the battery utilizes organic compounds comprising elements having a smaller mass such as sulfur and carbon as electrode materials, these materials are effective to some degree in providing a battery with high energy density, however, there has been problems that the efficiency of rebinding of the dissociated disulfide bond is small and the stability of charge and discharge was not sufficient.

There has been suggested a battery utilizing an organic compound, as an active material, i.e., a battery utilizing a conductive polymer as an electrode material. This battery performs charge and discharge by doping and undoping reactions of electrolyte ions for the conductive polymer. The doping reaction as described herein is defined as a reaction of stabilizing excitons such as charged solitons and polarons generated by the electrochemical redox reaction of the conductive polymer by counter ions. On the other hand, the undoping reaction as described herein is defined as a reverse reaction of the doping reaction, that is, the reaction of oxidizing or reducing electrochemically the excitons stabilized by the counter ions.

U.S. Pat. No. 4,442,187 has disclosed a battery using the conductive polymer as a positive electrode material or a negative electrode material. Since the conductive polymer of the battery is composed of elements having a lower mass such as carbon and nitrogen, the development of a battery having a large capacity and a high energy density has been expected.

The conductive polymer, however, has a property in general that excitons generated by electrochemical redox reaction are delocalized over a wide region of π-electron conjugated system and interact each other, which causes a problem of limiting the concentration of excitons generated, and therefore, imposing restriction on the capacity of the battery.

Therefore, the battery which utilizes this kind of conductive polymer as an electrode material has been still insufficient from a view point of producing a battery having a large capacity although it has been effective in producing a lightweight battery.

As described above, it is impossible in principle to produce a battery having an energy density higher than existing ones by a lithium-ion battery utilizing a heavy metal oxide as an active material of positive electrode. There have been various proposals for a battery which utilizes a light mass compound as an active material of electrode in place of a heavy metal oxide having heavy mass, however, a battery having a high energy density with excellent stability has not been obtained yet.

SUMMARY OF THE INVENTION

The purpose of the present invention is to provide a lightweight battery having a high energy density and excellent stability and to provide electrodes suitable for forming the battery having these characteristics.

As a result of extensive and thorough research, the inventors found out specific organic compounds which have not been utilized yet as active materials of electrode in spite of being composed of only atoms having lower masses, i.e., nitroxyl radical compounds can be utilized as active materials of electrode. According to the present invention, it is possible to provide a novel battery having a high energy density and excellent stability by containing these specific nitroxyl radical compounds as active materials of electrode.

Namely, the present invention relates to a battery comprising at least a positive electrode, a negative electrode and an electrolyte as composing elements, wherein the positive electrode and/or the negative electrode comprise an active material of a nitroxyl radical compound represented by the following general formula (1) as a starting material or a reaction product of at least a discharge reaction of electrode reactions:

(1)

wherein Ar represents a substituted or unsubstituted aromatic heterocyclic group containing nitrogen wherein one endocyclic nitrogen atom or at least one of plural endocyclic nitrogen atoms exists as N-oxide; the substituent $R_1$ represents hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, or substituted or unsubstituted acyl group, wherein one or more of the atoms may be substituted with sulfur atom, silicon atom, phosphorus atom or boron atom; $R_1$ may be the identical with Ar and a ring structure may be formed between $R_1$ and Ar.

The present invention relates also to the battery as described above, wherein the nitroxyl radical compounds is represented by the following general formula (2):

(2)

wherein the substituents $R_1$ to $R_5$ represent independently hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, or substituted or unsubstituted acyl group, wherein one or more of the atoms may be substituted with sulfur atom, silicon atom, phosphorus atom or boron atom; a ring structure may be formed between substituents.

The present invention relates also to the battery as described above, wherein the nitroxyl radical compound is represented by the following general formula (3):

(3)

wherein the substituents $R_1$ to $R_5$ represent independently hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, or substituted or unsubstituted acyl group, wherein one or more of the atoms may be substituted with sulfur atom, silicon atom, phosphorus atom or boron atom; a ring structure may be formed between the substituents.

The present invention relates also to the battery as described above, wherein the nitroxyl radical compound is a polymer compound having structure units at least represented by the following general formulas (4) to (7):

(4)

(5)

(6)

(7)

wherein the substituents $R_3$ to $R_5$ in the general formula (4), the substituents $R_2$, $R_4$ and $R_5$ in the general formula (5), the substituents $R_2$, $R_3$ and $R_5$ in the general formula (6), and the substituents $R_3$, $R_4$ and $R_5$ in the general formula (7) represent in each formula independently hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, or substituted or unsubstituted acyl group, wherein one or more of the atoms may be substituted with sulfur atom, silicon atom, phosphorus atom or boron atom; a ring structure may be formed between the substituents.

The present invention relates also to any one of the batteries as described above, wherein the nitroxyl radical compound is contained in the positive electrode as a starting material or a reaction product in at least a discharge reaction of electrode reactions.

The present invention relates also to any one of the batteries as described above, wherein the nitroxyl radical compound is contained in the positive electrode and/or the negative electrode as a starting material in the charge-discharge reaction of electrode reactions.

The present invention relates also to the batteries as described above, wherein the secondary battery is a lithium secondary battery.

The present invention relates also to a battery electrode, wherein a nitroxyl radical compound represented by any one of the general formula (1) to (7) as described above is contained as a starting material or a reaction product of at least a discharge reaction of electrode reactions.

According to the present invention, it is possible to obtain a battery comprising at least a positive electrode, a negative electrode and an electrolyte as composing elements which characterizes a high energy density and excellent stability by containing nitroxyl radical compounds in the positive electrode and/or in the negative electrode as active materials.

Furthermore, it is possible to obtain a battery characterized by less weight and more excellent safety as compared with the conventional ones which use heavy metals having high masses as active materials, since the battery of the present invention uses the nitroxyl radical compounds composed of low mass elements only.

DETAILED DESCRIPTION OF THE EMBODIMENTS

Figure 1:
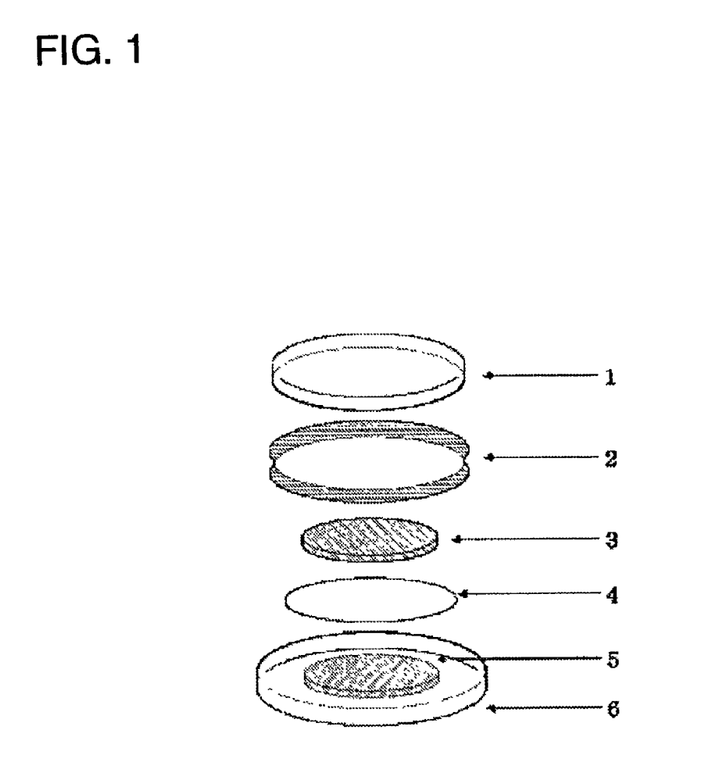
FIG. 1 is an explanatory drawing showing an example of the structure of the battery of the present invention.

FIG. 1 shows a configuration of one of the embodiments of the battery of the present invention. The battery shown in FIG. 1 has a configuration wherein a positive electrode 5 and a negative electrode 3 which is placed on a current collector 1 of negative electrode are piled facing each other via a separator 4 containing an electrolyte and furthermore, a current collector 6 of positive electrode is piled on the positive electrode 5. An insulating packing 2 made of insulating materials such as plastic resins is placed between the current collector 1 of negative electrode and the current collector 6 of positive electrode for the purpose of preventing the electrical contact between both current collectors. When a solid electrolyte or a gel electrolyte is utilized, these electrolytes can also be placed between the electrodes in place of the separator.

In the present embodiment of this configuration the active materials used in the negative electrode 3 and/or the positive electrode 5 contain the nitroxxyl radical compounds as described above. Furthermore, the nitroxyl radical compounds used as active materials may be contained in the electrolytes.

The battery of the present invention is preferable to be a lithium secondary battery having the positive electrode containing the nitroxyl radical compounds as described above as the active materials of positive electrode in the light of the battery capacity.

[1] Active Materials

The active materials used in the present invention are the materials which directly contribute to the electrode reactions such as charge reaction and discharge reaction and play a central role in the battery system.

The active materials in the present invention may be in a solid state or in a dissolved or dispersed state in the electrolytes.

[1-1] Nitroxyl Radical Compounds

The nitroxyl radical compounds utilized as active materials in the present invention are low-molecular weight compounds represented by general formulas (1) to (3) as described above and high-molecular weight compounds represented by general formulas (4) to (7). These nitroxyl radical compounds can be used as one kind or as combined by more than two kinds.

In the nitroxyl radical compounds represented by general formula (1) the substituent Ar is a substituted or unsubstituted aromatic heterocyclic group containing nitrogen wherein one endocyclic nitrogen atom or at least one of plural endocyclic nitrogen atoms exists as N-oxide. Examples of the substituents Ar include 1-pyrazolyl group, 3-pyrazolyl group, 4-pyrazolyl group, 5-pyrazolyl group, 2-pyridinyl group, 3-pyridinyl group, 4-pyridinyl group, pyrazinyl group, 2-pyrimidinyl group, 4-pyrimidinyl group, 5-pyrimidinyl group, 3-pyridazinyl group, 4-pyridazinyl group, 1,3,5-triazine-2-yl group, 1,2,4-triazine-3-yl group, 1,2,4-triazine-5-yl group, 1,2,4-triazine-6-yl group, 1-indolizinyl group, 2-ndolizinyl group, 3-indolizinyl group, 5-indolizinyl group, 6-indolizinyl group, 7-indolizinyl group, 8-indolizinyl group, 1H-indazole-1-yl group, 2-prinyl group, 6-prinyl group, 7-prinyl group, 8-prinyl group, 2-quinolyl group, 3-quinolyl group, 4-quinolyl group, 5-quinolyl group, 6-quinolyl group, 7-quinolyl group, 8-quinolyl group, 1-isoquinolyl group, 3-isoquinolyl group, 4-isoquinolyl group, 5-isoquinolyl group, 6-isoquinolyl group, 7-isoquinolyl group, 8-isoquinolyl group, 2-quinoxalinyl group, 5-quinoxalinyl group, 6-quinoxalinyl group, 1,8-naphthyridine-2-yl group, 1,8-naphthyridine-3-yl group, 1,8-naphthyridine-4-yl group, 2-quinazolinyl group, 1-phenazinyl group, and 2-phenazinyl group, wherein at least one of the endocyclic nitrogen atoms exists as N-oxide, and derivatives of these groups.

In the nitroxyl radical compounds represented by general formulas (1) to (7) the halogen atoms in the substituents $R_1$ to $R_5$ are, for example, fluorine, chlorine, bromine, and iodine and the substituents can have one kind alone or combination of two or more than two kinds of these halogen atoms.

Examples of the substituted or unsubstitued alkyl groups include methyl group, ethyl group, propyl group, isopropyl group, n-butyl group, s-butyl group, isobutyl group, t-butyl group, n-pentyl group, n-hexyl group, n-heptyl group, n-octyl group, hydroxymethyl group, 1-hydroxyethyl group, 2-hydroxyethyl group, 2-hydroxyisobutyl group, 1,2-dihydroxyethyl group, 1,3-dihydroxyisopropyl group, 2,3-dihydroxy-t-butyl group, 1,2,3-trihydroxypropyl group, chloromethyl group, 1-chloroethyl group, 2-chloroethyl group, 2-chloroisobutyl group, 1,2-dichloroethyl group, 1,3-dichloroisopropyl group, 2,3-dichloro-t-butyl group, 1,2,3-trichloropropyl group, bromomethyl group, 1-bromoethyl group, 2-bromoethyl group, 2-bromoisobutyl group, 1,2-dibromoethyl group, 1,3-dibromoisopropyl group, 2,3-dibromo-t-butyl group, 1,2,3-tribromopropyl group, iodomethyl group, 1-iodoethyl group, 2-iodoethyl group, 2-iodoisobutyl group, 1,2-diiodoethyl group, 1,3-diiodoisopropyl group, 2,3-diiodo-t-butyl group, 1,2,3-triiodopropyl group, aminomethyl group, 1-aminoethyl group, 2-aminoethyl group, 2-aminoisobutyl group, 1,2-diaminoethyl group, 1,3-diaminoisopropyl group, 2,3-diamino-t-butyl group, 1,2,3-triaminopropyl group, cyanomethyl group, 1-cyanoethyl group, 2-cyanoethyl group, 2-cyanoisobutyl group, 1,2-dicyanoethyl group, 1,3-dicyanoisopropyl group, 2,3-dicyano-t-butyl group, 1,2,3-tricyanopropyl group, nitromethyl group, 1-nitroethyl group, 2-nitroethyl group, 2-nitroisobutyl group, 1,2-dinitroethyl group, 1,3-dinitroisopropyl group, 2,3-dinitro-t-butyl group and 1,2,3-trinitropropyl group, and the nitroxyl radical compounds can have one kind alone or the combination of two or more than two kinds of these groups.

Examples of the substituted or unsubstitued alkenyl groups include vinyl group, allyl group, 1-butenyl group, 2-butenyl group, 3-butenyl group, 1,3-butanedienyl group, 1-methylvinyl group, styryl group, 2,2-diphenylvinyl group, 1,2-diphenylvinyl group, 1-methylallyl group, 1,1-dimethylallyl group, 2-methylallyl group, 1-phenylallyl group, 2-phenylallyl group, 3-phenylallyl group, 3,3-diphenylallyl group, 1,2-dimethylallyl group, 1-phenyl-1-butenyl group and 3-phenyl-1-butenyl group, and the nitroxyl radical compounds can have one kind alone or the combination of two or more than two kinds of these groups.

Examples of the substituted or unsubstitued cycloalkyl groups include cyclopropyl group, cyclobutyl group, cyclopentyl group, cyclohexyl group and 4-methylcyclohexyl group, and the nitroxyl radical compounds can have one kind alone or the combination of two or more than two kinds of these groups.

Examples of the substituted or unsubstitued aromatic hydrocarbon groups include phenyl group, 1-naphthyl group, 2-naphthyl group, 9-fluorenyl group, 1-anthryl group, 2-anthryl group, 9-anthryl group, 1-phenanthryl group, 2-phenanthryl group, 3-phenanthryl group, 4-phenanthryl group, 9-phenanthryl group, 1-naphtacenyl group, 2-naphtacenyl group, 9-naphtacenyl group, 1-pyrenyl group, 2-pyrenyl group, 4-pyrenyl group, 2-biphenylyl group, 3-biphenylyl group, 4-biphenylyl group, p-terphenyl-4-yl group, p-terphenyl-3-yl group, p-terphenyl-2-yl group, m-terphenyl-4-yl group, m-terphenyl-3-yl group, m-terphenyl-2-yl group, o-tolyl group, m-tolyl group, p-tolyl group, p-t-butylphenyl group, p-(2-phenylpropyl)phenyl group, 3-methyl-2-naphthyl group, 4-methyl-1-naphthyl group, 4-methyl-1-anthryl group, 4'-methylbiphenylyl group, 4"-t-butyl-p-terphenyl-4-yl group, and the derivatives of these groups, and the nitroxyl radical compounds can have one kind alone or the combination of two or more than two kinds of these groups.

Examples of the substituted or unsubstitued aromatic heterocyclic groups include 1-pyrrolyl group, 2-pyrrolyl group, 3-pyrrolyl group, pyrazinyl group, 2-pyrydinyl group, 3-pyrydinyl group, 4-pyrydinyl group, 1-indolyl group, 2-indolyl group, 3-indolyl group, 4-indolyl group, 5-indolyl group, 6-indolyl group, 7-indolyl group, 1-isoindolyl group, 2-isoindolyl group, 3-isoindolyl group, 4-isoindolyl group, 5-isoindolyl group, 6-isoindolyl group, 7-isoindolyl group, 2-furil group, 3-furil group, 2-benzofuranyl group, 3-benzofuranyl group, 4-benzofuranyl group, 5-benzofuranyl group, 6-benzofuranyl group, 7-benzofuranyl group, 1-isobenzofuranyl group, 3-isobenzofuranyl group, 4-isobenzofuranyl group, 5-isobenzofuranyl group, 6-isobenzofuranyl group, 7-isobenzofuranyl group, 2-quinolyl group, 3-quinolyl group, 4-quinolyl group, 5-quinolyl group, 6-quinolyl group, 7-quinolyl group, 8-quinolyl group, 1-isoquinolyl group, 3-isoquinolyl group, 4-isoquinolyl group, 5-isoquinolyl group, 6-isoquinolyl group, 7-isoquinolyl group, 8-isoquinolyl group, 2-quinoxalinyl group, 5-quinoxalinyl group, 6-quinoxalinyl group, 1-carbazolyl group, 2-carbazolyl group, 3-carbazolyl group, 4-carbazolyl group, 9-carbazolyl group, 1-phenanthridinyl group, 2-phenanthridinyl group, 3-phenanthridinyl group, 4-phenanthridinyl group, 6-phenanthridinyl group, 7-phenanthridinyl group, -8-phenanthridinyl group, 9-phenanthridinyl group, 10-phenanthridinyl group, 1-acridinyl group, 2-acridinyl group, 3-acridinyl group, 4-acridinyl group, 9-acridinyl group, 1,7-phenanthroline-2-yl group, 1,7-phenanthroline-3-yl group, 1,7-phenanthroline-4-yl group, 1,7-phenanthroline-5-yl group, 1,7-phenanthroline-6-yl group, 1,7-phenanthroline-8-yl group, 1,7-phenanthroline-9-yl group, 1,7-phenanthroline-10-yl group, 1,8-phenanthroline-2-yl group, 1,8-phenanthroline-3-yl group, 1,8-phenanthroline-4-yl group, 1,8-phenanthroline-5-yl group, 1,8-phenanthroline-6-yl group, 1,8-phenanthroline-7-yl group, 1,8-phenanthroline-9-yl group, 1,8-phenanthroline-10-yl group, 1,9-phenanthroline-2-yl group, 1,9-phenanthroline-3-yl group, 1,9-phenanthroline-4-yl group, 1,9-phenanthroline-5-yl group, 1,9-phenanthroline-6-yl group, 1,9-phenanthroline-7-yl group, 1,9-phenanthroline-8-yl group, 1,9-phenanthroline-10-yl group, 1,10-phenanthroline-2-yl group, 1,10-phenanthroline-3-yl group, 1,10-phenanthroline-4-yl group, 1,10-phenanthroline-5-yl group, 2,9-phenanthroline-1-yl group, 2,9-phenanthroline-3-yl group, 2,9-phenanthroline-4-yl group, 2,9-phenanthroline-5-yl group, 2,9-phenanthroline-6-yl group, 2,9-phenanthroline-7-yl group, 2,9-phenanthroline-8-yl group, 2,9-phenanthroline-10-yl group, 2,8-phenanthroline-1-yl group, 2,8-phenanthroline-3-yl group, 2,8-phenanthroline-4-yl group, 2,8-phenanthroline-5-yl group, 2,8-phenanthroline-6-yl group, 2,8-phenanthroline-7-yl group, 2,8-phenanthroline-9-yl group, 2,8-phenanthroline-10-yl group, 2,7-phenanthroline-1-yl group, 2,7-phenanthroline-3-yl group, 2,7-phenanthroline-4-yl group, 2,7-phenanthroline-5-yl group, 2,7-phenanthroline-6-yl group, 2,7-phenanthroline-8-yl group, 2,7-phenanthroline-9-yl group, 2,7-phenanthroline-10-yl group, 1-phenazinyl group, 2-phenazinyl group, 1-phenothiazinyl group, 2-phenothiazinyl group, 3-phenothiazinyl group, 4-phenothiazinyl group, 10-phenothiazinyl group, 1-phenoxazinyl group, 2-phenoxazinyl group, 3-phenoxazinyl group, 4-phenoxazinyl group, 10-phenoxazinyl group, 2-oxazolyl group, 4-oxazolyl group, 5-oxazolyl group, 2-oxadiazolyl group, 5-oxadiazolyl group, 3-furazanyl group, 2-thienyl group, 3-thienyl group, 2-methylpyrrole-1-yl group, 2-methylpyrrole-3-yl group, 2-methylpyrrole-4-yl group, 2-methylpyrrole-5-yl group, 3-methylpyrrole-1-yl group, 3-methylpyrrole-2-yl group, 3-methylpyrrole-4-yl group, 3-methylpyrrole-5-yl group, 2-t-butylpyrrole-4-yl group, 3-(2-phenylpropyl)pyrrole-1-yl group, 2-methyl-1-indolyl group, 4-methyl-1-indolyl group, 2-methyl-3-indolyl group, 4-methyl-3-indolyl group, 2-t-butyl-1-indolyl group, 4-t-butyl-1-indolyl group, 2-t-butyl-3-indolyl group, 4-t-butyl-3-indolyl group, and the derivatives of these groups, and the nitroxyl radical compounds can have one kind alone or the combination of two or more than two kinds of these groups.

Examples of the substituted or unsubstitued aralkyl groups include benzyl group, 1-phenylethyl group, 2-phenylethyl group, 1-phenylisopropyl group, 2-phenylisopropyl group, phenyl-t-butyl group, α-naphthylmethyl group, 1-α-naphthylethyl group, 2-α-naphthylethyl group, 1-α-naphthylisopropyl group, 2-α-naphthylisopropyl group, β-naphthylmethyl group, 1-β-naphthylethyl group, 2-β-naphthylethyl group, 1-β-naphthylisopropyl group, 2-β-naphthylisopropyl group, 1-pyrrolylmethyl group, 2-(1-pyrrolyl)ethyl group, p-methylbenzyl group, m-methylbenzyl group, o-methylbenzyl group, p-chlorobenzyl group, m-chlorobenzyl group, o-chlorobenzyl group, p-bromobenzyl group, m-bromobenzyl group, o-bromobenzyl group, p-iodobenzyl group, m-iodobenzyl group, o-iodobenzyl group, p-hydroxybenzyl group, m-hydroxybenzyl group, o-hydroxybenzyl group, p-aminobenzyl group, m-aminobenzyl group, o-aminobenzyl group, p-nitrobenzyl group, m-nitrobenzyl group, o-nitrobenzyl group, p-cyanobenzyl group, m-cyanobenzyl group, o-cyanobenzyl group, 1-hydroxy-2-phenylisopropyl group, 1-chloro-2-phenylisopropyl group, and the nitroxyl radical compounds can have one kind alone or the combination of two or more than two kinds of these groups.

The substituted or unsubstituted amino groups are those represented by $-NX^1X^2$ and the substituents $X^1$ and $X^2$ are independently, for example, hydrogen atom, the substituted or unsubstituted alkyl groups, the substituted or unsubstituted alkenyl groups, the substituted or unsubstituted cycloalkyl groups, the substituted or unsubstituted aromatic hydrocarbon groups, the substituted or unsubstituted aromatic heterocyclic groups, and the substituted or unsubstituted aralkyl groups, all of which are described above, and the nitroxyl radical compounds can have one kind alone or the combination of two or more than two kinds of these groups.

The substituted or unsubstituted alkoxy groups and the substituted or unsubstituted alkoxycarbonyl groups are those represented by $-OX^3$ and $-COOX^4$, respectively, and the substituents $X^3$ and $X^4$ are, for example, the substituted or unsubstitued alkyl groups, the substituted or unsubstituted cycloalkyl groups, and the substituted or unsubstituted aralkyl groups, all of which are described above, respectively, and the nitroxyl radical compounds can have one kind alone or the combination of two or more than two kinds of these groups.

The substituted or unsubstituted aryloxy groups and the substituted or unsubstituted aryloxycarbonyl groups are those represented by $-OX^5$ and $-COOX^6$, respectively, and the substituents $X^5$ and $X^6$ are, for example, the substituted or unsubstituted aromatic hydrocarbon groups and the substituted or unsubstituted aromatic heterocyclic groups, all of which are described above, respectively, and the nitroxyl radical compounds can have one kind alone or the combination of two or more than two kinds of these groups.

The substituted or unsubstituted acyl groups are those represented by $-C(=O)X^7$ and the substitutents $X^7$ are, for example, hydrogen atom, the substituted or unsubstituted alkyl groups, the substituted or unsubstituted alkenyl groups, the substituted or unsubstituted cycloalkyl groups, the substituted or unsubstituted aromatic hydrocarbon groups, the substituted or unsubstituted aromatic heterocyclic groups, and the substituted or unsubstituted aralkyl groups, all of which are described above, and the nitroxyl radical compounds can have one kind alone or the combination of two or more than two kinds of these groups.

The nitroxyl radical compounds described above in the present invention can be produced by the synthetic method already known (for example, H. Goto, K. Iino, K. Akagi, H. Shirakawa, Synthetic Metals, Vol. 85, P. 1683, (1997)). The chemical compound represented by the following chemical formula (16), for example, can be obtained by treating polyaminopyridine with metachloroperbenzoic acid in dichloromethane.

The nitroxyl radical compounds used in the present invention are, for example, the chemical compounds represented by the following chemical formulas:

(8)

(9)

(10)

(11)

(12)

(13)

(14)

[1-2] Other Active Materials

As explained so far, the batteries of the present invention contain the nitroxyl radical compounds as described above as active materials of the positive electrode and/or the negative electrode. Since the nitroxyl radical compounds as described above have low masses and excellent energy density as compared with the active materials of metal oxides, the nitroxyl radical compounds are preferably utilized as the active materials of the positive electrodes.

When the nitroxyl radical compounds as described above are used as active materials of either the positive electrode or the negative electrode, the following materials already known can be utilized as the active materials of the other electrode:

When the nitroxyl radical compounds are used as active materials of the negative electrodes, metal oxides particles, disulfide compounds, conductive polymers can be utilized as active materials of the positive electrodes. Examples of the metal oxides include lithium manganates such as $LiMnO_2$ and $Li_xMn_2O_4$ (0<x<2), lithium manganates having spinel structures, $MnO_2$, $LiCoO_2$, $LiNiO_2$ and $Li_xV_2O_5$ (0<x<2); examples of the disulfide compounds include dithioglycol, 2,5-dimercapto-1,3,4-thiadiazole and S-triazine-2,4,6-trithiol; examples of the conductive polymers include polyacetylene, polyphenylene, polyaniline and polypyrrole. These active materials of positive electrode can also be used as one kind or the combination of two or more than two kinds. Furthermore, these active materials already known and the nitroxyl radical compounds as described above may be used as compound active materials by mixing them.

On the other hand, when the nitroxyl radical compounds are used as active materials of the positive electrodes, the active materials of the negative electrodes are, for example, graphite, amorphous carbon, lithium metal, lithium alloy, lithium ion absorbing carbon, and conductive-polymers, and these materials can be used as one kind alone or the combination of two or more than two kinds. The shapes of the active materials of the negative electrodes are not particularly limited and, for example, the lithium metal and the lithium alloy can be utilized as bulk, solidified powders, fibers, flakes in addition to foils. Furthermore, these active materials already known and the nitroxyl radical compounds as described above may be used as compound active materials by mixing them.

[2] Conductive Adjuvant and Ion-conductive Adjuvant

In the present invention, when forming electrodes containing the nitroxyl radical compounds, conductive adjuvants or ion-conductive adjuvants may be mixed with the electrodes for the purpose of reducing the impedance of the electrodes. The conductive adjuvants are, for example, cabonaceous fine powders such as graphite, carbon black and acetylene black, or conductive polymers such as polyaniline, polypyrrole, polythiophene, polyacetylene and polyacene. The ion-conductive adjuvants are, for example, gel electrolytes and solid electrolytes.

[3] Binding Materials

In the present invention, binding materials may be mixed with the electrode materials for the purpose of strengthening the bonding force between the constituent materials of the electrodes. The binding materials are, for example, resin binders such as polyvinylidene fluoride, vinylidene fluoride-hexafluoropropylene copolymer, vinylidene fluoride-tetrafluoroethylene copolymer, styrene-butadiene rubber, polytetrafluoroethylene, polypropylene, polyethylene, and polyimide.

[4] Catalysts

In the present invention, catalysts which promote redox reaction may be mixed with the electrode materials for the purpose of carrying out the electrode reaction smoothly. The catalysts are, for example, conductive polymers such as polyaniline, polypyrrole, polythiophene, polyacetylene and polyacene; basic compounds such as pyridine derivatives, pyrrolidone derivatives, benzimidazole derivatives, benzothiazole derivatives and acridine derivatives; and metal ion complexes.

[5] Current Collectors and Separators

In the present invention, current collector 1 of negative electrode and current collector 6 of positive electrode can be provided in the form of metal foils, metal plates, and meshed electrodes made of nickel, aluminum, cupper, gold, silver, aluminum alloy or stainless steel, and carbon electrodes. Utilization of the current collectors having catalytic activity and chemical bonding between active materials and the current collectors may be allowed. For the purpose of avoiding electrical contact between the current collector 1 of negative electrode and the current collector 6 of positive electrode, the insulating packing 2 made of plastic resins may be placed between them.

Porous films and non-woven cloth can be used as materials of the separator used for the purpose of avoiding contact between positive electrode 5 and negative electrode 3.

[6] Electrolytes

In the present invention, the role of the electrolytes is to transfer electric charge carriers and the electrolytes in general have preferably the ion-conductivity of $10^{-5}$ to $10^{-1}$ S/cm at room temperature. Electrolytes which are prepared by dissolving electrolytic salts in solvents, for example, can be utilized as the electrolytes in the present invention.

Materials already known, for example, $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, $Li(C_2F_5SO_2)_3C$ may be utilized as the electrolytic salts.

Organic solvents, for example, ethylenecarbonate, propylenecarbonate, dimethylcarbonate, diethylcarbonate, methylethylcarbonate, γ-butyrolactone, tetrahydrofuran, dioxolane, sulfolane, dimethylformamide, dimethylacetamide, and N-methyl-2-pyrrolidone can be used as the solvents of electrolytes salts. In the present invention, these solvents may be used as one kind alone or mixture solvents of more than two kinds.

Furthermore, in the present invention polymer electrolytes may be used and polymer compounds wherein an electrolyte is impregnated may be used as gel state. Polymer compounds themselves as solid electrolytes may also be used as they are.

Examples of these polymer compounds include vinylidenefluoride-polymers such as polyvinylidene fluoride, vinylidenefluoride-ethylene copolymer, vinylidenefluoride-monofluoroethylene copolymer, vinylidenefluoride-trifluoroethylene copolymer, vinylidenefluoride-tetrafluoroethylene copolymer, vinylidenefluoride-hexafluoropropylene copolymer, vinylidenefluoride-hexafluoropropylene-tetrafluoroethylene three-component copolymer; acrylonitrile-polymers such as acrylonitrile-methylmethacrylate copolymer, acrylonitrile-ethylmethacrylate copolymer, acrylonitrile-methylacrylate copolymer, acrylonitrile-ethylacrylate copolymer, acrylonitrile-methacrylic acid copolymer, acrylonitrile-acrylic acid copolymer, acrylonitrile-vinylacetate copolymer; poly(ethylene oxide), ethylene oxide-propylene oxide copolymer, and acrylate esters and methacrylate esters of these compounds, and these polymer compounds can be used as one kind or the combination of two or two or more than two kinds.

In the present invention, inorganic solid electrolytes can also be used. Examples of the inorganic solid electrolytes include $CaF_2$, $AgI$, $LiF$, β-Alumina and glass raw materials.

[7] Shapes of the Batteries

The shapes and exterior appearances of the batteries in the present invention are not particularly limited and conventional types of them already known can be adopted. That is, the shapes of the batteries are, for example, those of laminated or wound electrodes which are sealed by metal cases, plastic cases, or laminated films composed of metal foils such as aluminum ones and plastic films. Examples of the exterior appearance of the batteries include cylinder types, square types, coin types and sheet types.

[8] The Laminating Methods of Electrodes

The laminating methods of the positive and negative electrodes in the present invention are not particularly limited and any methods can be adopted.

As the embodiments of the lamination, there are, for example, multiple laminations, and the lamination may be made by combining products of electrodes formed on the both sides of current collector and, in addition, the lamination may be wound.

[9] The Methods of Producing the Electrodes and the Batteries

In the present invention, the methods of producing the electrodes and the batteries are not particularly limited and conventional methods already known can be adopted.

The methods of producing the electrodes are, for example, those of coating the slurry which is made by mixing a solvent to the components of electrodes, on the current collector, those of adding binder resin to the components of electrodes and compacting them, and those of baking the components of electrodes by heating.

One of the methods of producing the batteries is, for example, a method comprising laminating the produced electrode and the counter electrode via a separator, winding the laminated electrodes as needed, covering the obtained electrodes with an exterior body, injecting an electrolyte into the body, and sealing it.

In the methods of producing the batteries of the present invention, the nitroxyl radical compounds as descried above may be used as they are, or also chemical compounds which are converted to the nitroxyl radical compounds by the electrode reactions, i.e., precursor compounds may be used.

In the batteries and electrodes of the present invention, the nitroxyl-radical compounds as described above are contained as starting materials or reaction products in the electrode reactions (discharge reaction or charge reaction). In the context that the nitroxyl radical compounds as described above are contained as reaction products in the electrode reactions, it means that the precurors of the nitroxyl radical compounds as described above exist before the electrode reactions and the nitroxyl radical compounds are produced from the precursors by the electrode reactions. The nitroxyl radical compounds as described above are contained as starting materials or reaction products related to the release and receipt of electrons during the discharge reaction in the primary batteries and the electrodes used in the primary batteries; on the other hand they are contained as starting materials or reaction products related to the release and receipt of electrons during the charge and discharge reaction in the secondary batteries and the electrodes used in the secondary batteries.

EXAMPLE

Specific examples of the present invention are explained in the following; however, the present invention is not restricted by the examples:

Example 1

The nitroxyl radical compound (25 mg) represented by the chemical formula (9), graphite powders (200 mg), and polytetrafluoroethylene resin binder (25 mg) were mixed in an agate mortar. The mixture which was obtained by dry mixing for about ten minutes was extended by a roller under pressure and a thin electrode plate having the thickness of 215 μm was obtained. After drying the thin electrode plate at 80° C. under vacuum for a night, a battery electrode was obtained by punching the plate in a circle having 12 mm diameter.

Then, the obtained electrode was dipped in an electrolyte to impregnate the electrolyte into the pore inside the electrode. As the electrolyte a mixture containing electrolytic salt $LiPF_6$ (1 mol/l) was used composing of ethylenecarbonate and diethylcarbonate (mixing ratio 3:7 by volume). The electrode impregnated with the electrolyte was placed on a current collector of positive electrode and a porous film separator impregnated with the electrolyte was piled above the electrode. Furthermore, a lithium metal plate forming a negative electrode was piled on the separator, and a current collector of negative electrode equipped with an insulating packing was piled on the lithium metal plate. The layered body was compressed by a tightening machine and a coin type battery of enclosed type structure was obtained.

To the battery produced according to the above method, discharging tests at constant current of 0.1 mA were carried out using an aluminum foil formed on a electrode-layer containing a nitroxyl radical compound represented by the chemical formula (9) as positive electrode and a cupper foil laminated on a lithium plate as negative electrode. As a result of the tests, flat parts of voltage curves were observed around 2.5 V and the performance as a battery was confirmed.

Furthermore, the voltage during the tests of repeating discharge and charge were measured and as a result of the tests, the flat parts of voltage curves were observed around 2.5 V even after 10 cycles of the tests and it was confirmed that the battery was functioning also as a secondary battery.

Comparative Example 1

An electrode was produced according to the same method as in Example 1 except for using graphite (25 mg) in place of the nitroxyl radical compound represented by the chemical formula (9) and a battery was produced using the same electrolyte, the same separator, the same current collector of positive electrode, and the same current collector of negative electrode as used in Example 1.

Discharging tests of the battery produced as described above were carried out according to the same method as in Example 1, however, as a result of the tests, the voltages reduced rapidly and performance as a battery was not confirmed.

When charging tests of the battery were carried out by sending a constant current of 0.1 mA, the voltages jumped up over 4.5 V instantly and then discharging tests were carried out, however, flat parts in the voltage curves were not observed, which confirmed that the battery did not function as a secondary battery.

Example 2

A battery was produced according to the same method as in Example 1 except for using the nitroxyl radical compound represented by the chemical formula (10) in place of that represented by the chemical formula (9) used in Example 1.

Discharging tests of the battery produced as described above were carried out according to the same method as in Example 1. As a result of the tests, flat parts of the voltage curves were observed around 2.4 V, which confirmed that the battery was functioning as a battery.

Furthermore, the voltage of the battery during tests of repeating discharge and charge were measured according to the same method as in Example 1 and as a result of the tests, it was confirmed that it was possible to carry out repeating 10 cycles of discharge and charge and that the battery was functioning as a secondary battery.

Examples 3–6

In Example 3, 4, 5 and 6, batteries were produced according to the same method as in Example 1 except for using the nitroxyl radical compound represented by the chemical formula (11), the chemical formula (14), the chemical formula (16) and the chemical formula (19) respectively, in place of that represented by the chemical formula (9) used in Example 1.

Discharging tests of the batteries produced as described above were carried out according to the same method as in Example 1. As a result of the tests, flat parts of the voltage curves were observed in every test, which confirmed that the batteries were functioning as batteries.

Furthermore, the voltages of the batteries during the tests of repeating discharge and charge were measured according to the same method as in Example 1 and as a result of the tests, it was confirmed that it was possible to carry out repeating 10 cycles of discharge and charge and that the batteries were also functioning as secondary batteries.

What is claimed is:

1. A battery comprising at least a positive electrode, a negative electrode and an electrolyte as composing elements, wherein at least one of the positive electrode or the negative electrode comprise an active material of a nitroxyl radical compound represented by the following general formula (3) as a starting material or a reaction product of at least a discharge reaction of electrode reactions:

(3)

wherein the substituents $R_1$ to $R_5$ represent independently hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, or substituted or unsubstituted acyl group.

2. The battery according to claim 1, wherein the nitroxyl radical compound is contained in the positive electrode as a starting material or a reaction product in at least a discharge reaction of electrode reactions.

3. The battery according to claim 1, wherein the nitroxyl radical compound is contained in at least one of the positive electrode or the negative electrode as a starting material or a reaction product in the charge-discharge reaction of electrode reactions to thereby form a secondary battery.

4. The battery according to claim 3, wherein the secondary battery is a lithium secondary battery.

* * * * *